(12) United States Patent
Jung et al.

(10) Patent No.: US 9,741,462 B2
(45) Date of Patent: Aug. 22, 2017

(54) METHOD OF MANUFACTURING SILICON OXIDE

(71) Applicant: LG CHEM LTD., Seoul (KR)

(72) Inventors: Sang Yun Jung, Daejeon (KR); Han Nah Jeong, Daejeon (KR); Cheol Hee Park, Daejeon (KR); Hyun Chul Kim, Daejeon (KR); Byung Kyu Lim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 219 days.

(21) Appl. No.: 14/106,213

(22) Filed: Dec. 13, 2013

(65) Prior Publication Data

US 2014/0103253 A1 Apr. 17, 2014

Related U.S. Application Data

(63) Continuation of application No. PCT/KR2013/009211, filed on Oct. 15, 2013.

(30) Foreign Application Priority Data

Oct. 16, 2012 (KR) .................. 10-2012-0114839
Oct. 14, 2013 (KR) .................. 10-2013-0122145

(51) Int. Cl.
*H01B 1/08* (2006.01)
*C01B 33/113* (2006.01)
(Continued)

(52) U.S. Cl.
CPC .............. *H01B 1/08* (2013.01); *C01B 33/113* (2013.01); *C01B 33/181* (2013.01);
(Continued)

(58) Field of Classification Search
CPC ....... C01B 33/12; C01B 33/113; C01B 33/18; C01B 33/181; C01B 33/182; H01B 1/08; H01M 4/386; H01M 4/131; H01M 4/485
(Continued)

(56) References Cited

U.S. PATENT DOCUMENTS 3,010,797 A * 11/1961 Aries .................... C01B 33/027
                                                        422/202
3,087,789 A *  4/1963 Van Antwerp ........ C01B 33/113
                                                        106/482
(Continued)

FOREIGN PATENT DOCUMENTS

EP          1 236 682 A1    9/2002
JP         2001-0158613     6/2001
(Continued)

OTHER PUBLICATIONS

English Machine Translation of JP 2011-142021 A (2011).*

*Primary Examiner* — Harold Pyon
*Assistant Examiner* — Matthew R Diaz
(74) *Attorney, Agent, or Firm* — Dentons US LLP

(57) ABSTRACT

Provided is a method of manufacturing silicon oxide by which an amount of oxygen of the silicon oxide may be controlled. The method of manufacturing silicon oxide may include mixing silicon and silicon dioxide to be included in a reaction chamber, depressurizing a pressure of the reaction chamber to obtain a high degree of vacuum while increasing a temperature in the reaction chamber to a reaction temperature, and reacting the mixture of silicon and silicon dioxide in a reducing atmosphere.

3 Claims, 1 Drawing Sheet

(51) Int. Cl.
  *H01M 4/48*   (2010.01)
  *H01M 4/485*  (2010.01)
  *C01B 33/18*  (2006.01)
  *H01M 10/052* (2010.01)
  *H01M 4/131*  (2010.01)
  *H01M 10/05*  (2010.01)

(52) U.S. Cl.
  CPC .......... *H01M 4/483* (2013.01); *H01M 4/485* (2013.01); *H01M 4/131* (2013.01); *H01M 4/48* (2013.01); *H01M 10/05* (2013.01); *H01M 10/052* (2013.01)

(58) Field of Classification Search
  USPC .................................. 423/325, 335, 336, 339
  See application file for complete search history.

(56) References Cited

U.S. PATENT DOCUMENTS

| | | | | |
|---|---|---|---|---|
| 5,096,685 | A * | 3/1992 | Funahashi | B82Y 30/00 423/325 |
| 6,333,013 | B1 * | 12/2001 | Yoshida | C01B 33/18 423/335 |
| 6,685,906 | B2 * | 2/2004 | Fukuoka | C01B 33/113 423/325 |
| 6,821,495 | B2 * | 11/2004 | Fukuoka | C01B 33/113 423/325 |
| 6,893,621 | B2 * | 5/2005 | Fukuoka | C01B 33/113 423/332 |
| 7,794,681 | B2 * | 9/2010 | Fukuoka | C01B 33/182 423/325 |
| 2007/0254102 | A1 * | 11/2007 | Fukuoka | C01B 33/113 427/255.27 |
| 2008/0135801 | A1 | 6/2008 | Kizaki et al. | |

FOREIGN PATENT DOCUMENTS

| | | |
|---|---|---|
| JP | 2003-192327 | 7/2003 |
| JP | 2011-142021 | 7/2011 |
| KR | 10-2007-0020130 | 2/2007 |
| KR | 10-2012-0089073 | 8/2012 |

\* cited by examiner

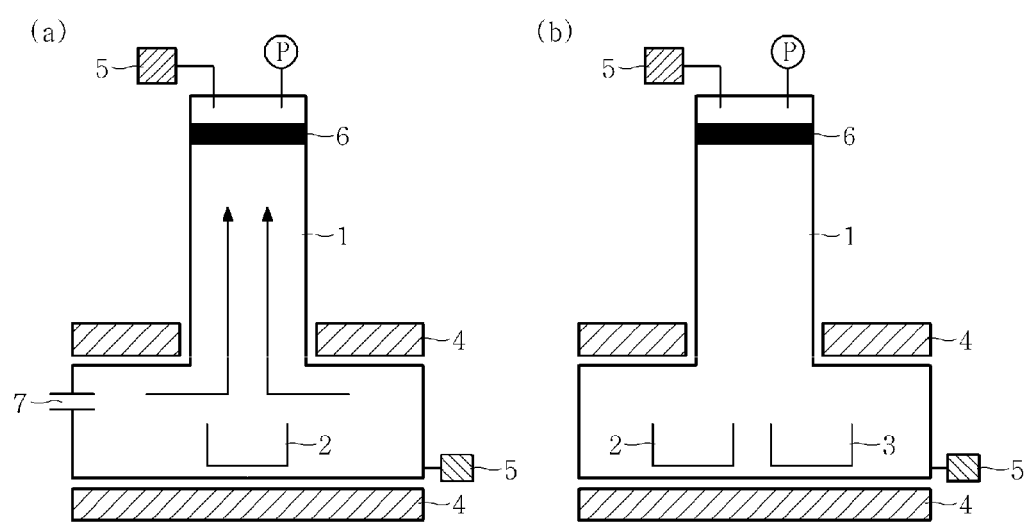

METHOD OF MANUFACTURING SILICON OXIDE

This application is a Continuation Bypass Application of International Patent Application No. PCT/KR2013/009211, filed Oct. 15, 2013, and claims the benefit of Korean Patent Application No. 10-2012-0114839 filed on Oct. 16, 2012, and Korean Patent Application No. 10-2013-0122145 filed on Oct. 14, 2013, in the Korean Intellectual Property Office, the disclosures of which are incorporated herein by reference.

TECHNICAL FIELD

The present invention relates to a method of manufacturing silicon oxide by which an amount of oxygen of the silicon oxide may be controlled.

BACKGROUND ART

A lithium secondary battery is an energy storage device in which electrical energy is stored in the battery while lithium moves from an anode to a cathode during a discharge process and lithium ions move from the cathode to the anode during charging. When compared to other batteries, lithium secondary batteries have higher energy density and lower self-discharge rate, and thus, the lithium secondary batteries have been widely used in various industries.

Components of a lithium secondary battery may be classified as a cathode, an anode, an electrolyte, and a separator. Lithium metal was used as an anode active material in an early lithium secondary battery. However, since safety concerns may occur as charge and discharge are repeated, lithium metal has been replaced with a carbon-based material, such as graphite. Since a carbon-based anode active material may have an electrochemical reaction potential with lithium ions that is similar to lithium metal and changes in a crystal structure may be small during continuous intercalation and deintercalation processes of lithium ions, continuous charge and discharge may be possible. Therefore, excellent charge and discharge lifetime may be provided.

However, techniques for developing a high capacity and high power anode active material have been required as the lithium secondary battery market has recently expanded from small-sized lithium secondary batteries used in portable devices to large-sized secondary batteries used in vehicles. Therefore, development of non-carbon-based anode active materials based on materials, such as silicon, tin, germanium, zinc, and lead, having a higher theoretical capacity than a carbon-based anode active material has been conducted.

The above anode active materials may increase energy density by improving charge and discharge capacity. However, since dendrites or a non-conductive compound may be generated on an electrode as the charge and discharge are repeated, charge and discharge characteristics may degrade or expansion and shrinkage may increase during the intercalation and deintercalation of lithium ions. Therefore, with respect to secondary batteries using the above anode active materials, retention of discharge capacity (hereinafter, referred to as "lifetime characteristics") according to the repeated charge and discharge may be insufficient, and a ratio of initial discharge capacity to initial charge capacity after manufacturing (discharge capacity/charge capacity; hereinafter, referred to as "initial efficiency") may also be insufficient.

DISCLOSURE OF THE INVENTION

Technical Problem

The present invention provides a method of manufacturing silicon oxide by which an amount of oxygen of the silicon oxide may be controlled.

Technical Solution

According to an aspect of the present invention, there is provided a method of manufacturing silicon oxide including mixing silicon and silicon dioxide to be included in a reaction chamber; depressurizing a pressure of the reaction chamber to obtain a high degree of vacuum while increasing a temperature in the reaction chamber to a reaction temperature; and reacting the mixture of silicon and silicon dioxide in a reducing atmosphere.

According to another aspect of the present invention, there is provided an anode active material including silicon oxide manufactured by the above method.

According to another aspect of the present invention, there is provided an anode including the above anode active material.

According to another aspect of the present invention, there is provided a lithium secondary battery including the above anode.

ADVANTAGEOUS EFFECTS

According to the present invention, since an amount of oxygen of silicon oxide may be controlled in a reducing atmosphere, an initial efficiency of a secondary battery may be increased, and since a reaction between $SiO_x$ and lithium atoms may be performed while maintaining a structure of $SiO_x$, lifetime characteristics may be improved.

BRIEF DESCRIPTION OF THE DRAWINGS

FIG. 1 is a schematic view illustrating a manufacturing apparatus of silicon oxide according to an embodiment of the present invention.

MODE FOR CARRYING OUT THE INVENTION

The present invention provides a method of manufacturing silicon oxide including mixing silicon and silicon dioxide to be included in a reaction chamber, depressurizing a pressure of the reaction chamber to obtain a high degree of vacuum while increasing a temperature in the reaction chamber to a reaction temperature, and reacting the mixture of silicon and silicon dioxide in a reducing atmosphere.

FIG. 1 is a schematic view illustrating a manufacturing apparatus of silicon oxide according to an embodiment of the present invention. Referring to FIG. 1, the manufacturing apparatus of silicon oxide according to the embodiment of the present invention includes a reaction chamber 1, a reactor 2, an electric furnace 4, a vacuum pump 5, and a collector 6. The reactor 2 is included in the reaction chamber 1 and a mixture of silicon and silicon dioxide is included in the reactor 2. A temperature in the reaction chamber 1 may be increased to a reaction temperature by using the electric furnace 4, and a degree of vacuum in the reaction chamber 1 may be increased to obtain a high degree of vacuum by using the vacuum pump 5 (e.g., rotary pump, turbo molecular pump, etc.). A reducing atmosphere in the reaction chamber 1 may be created or formed by supplying a gas capable of creating a reducing atmosphere into the reaction chamber 1 through a gas nozzle 7 after the pressure in the reaction chamber 1 reaches a high degree of vacuum (see FIG. 1(a)), and the reducing atmosphere may be created or formed by including one or more selected from the group consisting of active carbon, magnesium (Mg), aluminum (Al), tantalum (Ta), molybdenum (Mo), calcium (Ca), and zinc (Zn) in a separate container 3 in the reaction chamber 1 (see FIG. 1(b)). Silicon oxide manufactured in the reaction chamber 1 is $SiO_x$ (where 0<x<1) and is collected in the collector 6 that is included in the reaction chamber 1.

In the method of manufacturing silicon oxide according to an embodiment of the present invention, the mixing of the silicon and silicon dioxide may be performed by using a mechanical stirring device (e.g., paint shaker). However, the present invention is not limited thereto, and any method may be used so long as it may uniformly mix silicon and silicon dioxide. Silicon and silicon dioxide may be mixed in a molar ratio of 0.5:2 to 2:0.5. In the case that silicon and silicon dioxide are mixed in a molar ratio out of the above range, an amount of unreacted silicon or unreacted silicon dioxide may increase, and thus, productivity may decrease. The mixture of silicon and silicon dioxide prepared as above may be included in the reaction chamber.

Also, the method of manufacturing silicon oxide according to the embodiment of the present invention may include depressurizing the pressure of the reaction chamber to obtain a high degree of vacuum while increasing the temperature in the reaction chamber to a reaction temperature.

The reaction temperature may be in a range of 1300° C. to 1500° C. In the case that the reaction temperature is less than 1300° C., the reaction of silicon and silicon dioxide may decrease, and thus, the productivity of silicon oxide may decrease. In the case in which the reaction temperature is greater than 1500° C., silicon and silicon dioxide may be melted. Also, the reaction temperature may be held for 2 hours to 4 hours. The reason for limiting the holding time at the reaction temperature may be the same as that for limiting the reaction temperature.

In the method of manufacturing silicon oxide according to the embodiment of the present invention, the high degree of vacuum may be in a range of $10^{-4}$ torr to $10^{-1}$ torr. The high degree of vacuum may be formed by using a rotary pump and a turbo molecular pump. However, the present invention is not limited thereto. Since the reactivity may be thermodynamically high and a low-temperature reaction may be possible at a high degree of vacuum, it may be advantageous to maintain the high degree of vacuum. In the case that the high degree of vacuum is greater than $10^{-1}$ torr, the reaction of silicon and silicon dioxide may decrease, and thus, the productivity of silicon oxide may decrease and an amount of oxygen in silicon oxide may increase. The attainment of a degree of vacuum of less than $10^{-4}$ torr may not be facilitated in terms of equipment and process.

According to an embodiment of the present invention, the high degree of vacuum may be maintained until the reaction of silicon and silicon dioxide is completed, and the gas capable of creating a reducing atmosphere may be continuously injected into one side of the reaction chamber and continuously removed from another side of the reaction chamber.

The gas capable of creating a reducing atmosphere may be supplied into the reaction chamber at a flow rate of 1 standard cubic centimeter per minutes (sccm) to 1,000 sccm. In the case that the flow rate is less than 1 sccm, a reducing atmosphere may not be created, and thus, the amount of oxygen in silicon oxide may increase. In the case in which the flow rate is greater than 1,000 sccm, an excessive amount of gas may be supplied, and thus, a manufacturing process may be inefficient.

Also, the gas capable of creating a reducing atmosphere may include one or more selected from the group consisting of $H_2$, $NH_3$, and CO, and a mixed gas of an inert gas and $H_2$, $NH_3$, or CO. $H_2$, $NH_3$, or CO may be included in an amount of 1 vol % to 5 vol % based on the mixed gas.

It may be desirable for the reduction of the amount of oxygen to maintain the gas capable of creating a reducing atmosphere until the reaction is completed. The gas capable of creating a reducing atmosphere may be a $H_2$-containing gas including $H_2$ in an amount of 2 vol % to 5 vol %.

In particular, according to an embodiment of the present invention, a high degree of vacuum of $10^{-4}$ torr to $10^{-1}$ torr is maintained until the reaction is completed while continuously injecting and flowing the gas capable of creating a reducing atmosphere into the reaction chamber, and thus, the amount of oxygen in silicon oxide may be effectively controlled.

In the method of manufacturing silicon oxide according to the embodiment of the present invention, the reducing atmosphere may be created or formed by supplying the gas capable of creating a reducing atmosphere into a chamber, and may be created or formed by including a material, such as active carbon, in a separate container in the chamber.

The reducing atmosphere may be formed by including one or more selected from the group consisting of active carbon, magnesium, aluminum, tantalum, molybdenum, calcium, and zinc, which are included in the separate container in the reaction chamber.

The gas capable of creating a reducing atmosphere or the material, such as active carbon, that is included in the separate container in the reaction chamber may be reacted with oxygen during the reaction of silicon and silicon dioxide to reduce the amount of oxygen that is included in the silicon oxide manufactured.

Also, the present invention may provide an anode active material including silicon oxide, which is manufactured by the method of manufacturing silicon oxide including mixing silicon and silicon dioxide to be included in a reaction chamber, depressurizing a pressure of the reaction chamber to obtain a high degree of vacuum while increasing a temperature in the reaction chamber to a reaction temperature, and reacting the mixture of silicon and silicon dioxide in a reducing atmosphere.

Silicon oxide according to an embodiment of the present invention may be $SiO_x$, and in this case, x may satisfy 0≤x≤2, for example, 0<x<1.

Also, silicon in the silicon oxide may be crystalline or amorphous. In the case that the silicon included in the silicon oxide is crystalline, a crystal size of the silicon is 300 nm or less, may be 100 nm or less, and for example, may be in a range of 0.05 nm to 50 nm. In this case, the crystal size may be measured by X-ray diffraction (XRD) analysis or an electron microscope (e.g., scanning electron microscope (SEM), transmission electron microscope (TEM)).

Silicon particles generally used may accompany very complex crystal changes in reactions which electrochemically absorb, store, and release lithium atoms. Composition and crystal structure of the silicon particles change to silicon (Si) (crystal structure: Fd3m), LiSi (crystal structure: I41/a), $Li_2Si$ (crystal structure: C2/m), $Li_7Si_2$ (Pbam), and $Li_{22}Si_5$ (F23) as the reactions which electrochemically absorb, store, and release lithium atoms proceed. Also, a volume of the silicon particle expands to about 4 times according to the complex changes in the crystal structure. However, the reaction between $SiO_x$ according to the embodiment of the present invention and lithium atoms may be performed while maintaining the structure of $SiO_x$.

According to an embodiment of the present invention, the range of x in $SiO_x$ may be controlled by reacting silicon and silicon dioxide in a high degree of vacuum and a reducing atmosphere, and thus, the amount of oxygen in silicon oxide may be effectively controlled. As a result, an initial efficiency of a secondary battery may be increased.

Also, the present invention provides a secondary battery including a cathode including a cathode active material; a separator; an anode including the anode active material; and an electrolyte.

The anode active material may be prepared as an anode. For example, the anode active material of the present invention is mixed with a binder, a solvent, and a conductive agent and a dispersant if necessary, and stirred to prepare a slurry. Then, a current collector may be coated with the slurry and pressed to prepare the anode.

Examples of the binder may be a vinylidene fluoride-hexafluoropropylene copolymer (PVDF-co-HEP), polyvinylidene fluoride, polyacrylonitrile, polymethylmethacrylate, polyvinyl alcohol, carboxymethyl cellulose (CMC), starch, hydroxypropyl cellulose, regenerated cellulose, polyvinylpyrrolidone, tetrafluoroethylene, polyethylene, polypropylene, polyacrylate, an ethylene-propylene-diene monomer (EPDM), a sulfonated EPDM, a styrene-butadiene rubber (SBR), a fluoro rubber, or various copolymers.

N-methyl-2-pyrrolidone, acetone, or water may be used as the solvent.

The conductive agent is not particularly limited so long as it does not generate chemical changes in the battery as well as having conductivity. Examples of the conductive agent may be graphite such as natural graphite and artificial graphite; carbon black such as acetylene black, Ketjen black, channel black, furnace black, lamp black, and thermal black; conductive fibers such as carbon fibers and metal fibers; metal powder such as fluorocarbon powder, aluminum powder, and nickel powder; conductive whiskers such as zinc oxide whiskers and potassium titanate whiskers; conductive metal oxide such as titanium oxide; and a conductive material such as a polyphenylene derivative.

An aqueous-based dispersant or an organic dispersant, such as N-methyl-2-pyrrolidone, may be used as the dispersant.

Similar to the preparation of the anode, a cathode active material, a conductive agent, a binder, and a solvent are mixed to prepare a slurry, and then a cathode may be prepared by directly coating a metal current collector with the slurry or by casting the slurry on a separate support and laminating a cathode active material film separated from the support on a metal current collector.

Examples of the cathode active material may be a layered compound, such as lithium cobalt oxide ($LiCoO_2$) or lithium nickel oxide ($LiNiO_2$), or a compound substituted with one or more transition metals; lithium manganese oxides such as $Li_{1+y}Mn_{2-y}O_4$ (where y is 0 to 0.33), $LiMnO_3$, $LiMn_2O_3$, and $LiMnO_2$; lithium copper oxide ($Li_2CuO_2$); vanadium oxides such as $LiV_3O_8$, $LiFe_3O_4$, $V_2O_5$, and $Cu_2V_2O_7$; nickel (Ni)-site type lithium nickel oxide expressed by a chemical formula of $LiNi_{1-x}M_yO_2$ (where M is cobalt (Co), manganese (Mn), Al, copper (Cu), iron (Fe), magnesium (Mg), boron (B), or gallium (Ga), and y is 0.01 to 0.3); lithium manganese complex oxide expressed by a chemical formula of $LiMn_{2-y}M_yO_2$ (where M is Co, Ni, Fe, chromium (Cr), Zn, or Ta, and y is 0.01 to 0.1) or $Li_2Mn_3MO_8$ (where M is Fe, Co, Ni, Cu, or Zn); and $LiMn_2O_4$ having a part of lithium (Li) being substituted with alkaline earth metal ions. However, the cathode active material is not limited thereto.

A typical porous polymer film used as a typical separator, for example, a porous polymer film prepared from a polyolefin-based polymer, such as an ethylene homopolymer, a propylene homopolymer, an ethylene/butene copolymer, an ethylene/hexene copolymer, and an ethylene/methacrylate copolymer, may be used alone or by being laminated as the separator. A typical porous nonwoven fabric, for example, a nonwoven fabric formed of high melting point glass fibers or polyethylene terephthalate fibers may be used. However, the separator is not limited thereto.

In an electrolyte solution used in the present invention, a lithium salt, which may be included as the electrolyte, may be used without limitation so long as it is typically used in an electrolyte for a secondary battery. For example, one selected from the group consisting of $F^-$, $Cl^-$, $I^-$, $NO_3^-$, $N(CN)_2^-$, $BF_4^-$, $ClO_4^-$, $PF_6^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $CF_3CF_2SO_3^-$, $(CF_3SO_2)_2N^-$, $(FSO_2)_2N^-$, $CF_3CF_2(CF_3)_2CO^-$, $(CF_3SO_2)_2CH^-$, $(SF_5)_3C^-$, $(CF_3SO_2)_3C^-$, $CF_3(CF_2)_7SO_3^-$, $CF_3CO_2^-$, $CH_3CO_2^-$, $SCN^-$, and $(CF_3CF_2SO_2)_2N^-$ may be used as an anion of the lithium salt.

In the electrolyte used in the present invention, an organic solvent included in the electrolyte may be used without limitation so long as it is typically used, and typically, one or more selected from the group consisting of propylene carbonate, ethylene carbonate, diethyl carbonate, dimethyl carbonate, ethylmethyl carbonate, methylpropyl carbonate, dipropyl carbonate, dimethyl sulfoxide, acetonitrile, dimethoxyethane, diethoxyethane, vinylene carbonate, sulfolane, γ-butyrolactone, propylene sulfite, and tetrahydrofuran may be used.

In particular, ethylene carbonate and propylene carbonate, ring-type carbonates among the carbonate-based organic solvents, well dissociate the lithium salt in the electrolyte due to high dielectric constants as high-viscosity organic solvents, and thus, the ring-type carbonate may be used. Since an electrolyte having high electrical conductivity may be prepared when the ring-type carbonate is mixed with low-viscosity, low-dielectric constant linear carbonate, such as dimethyl carbonate and diethyl carbonate, in an appropriate ratio, the ring-type carbonate, for example, may be used.

Selectively, the electrolyte stored according to the present invention may further include an additive, such as an overcharge inhibitor, included in a typical electrolyte.

A separator is disposed between the cathode and the anode to form a battery structure, the battery structure is wound or folded to put in a cylindrical battery case or prismatic battery case, and then a secondary battery is completed when the electrolyte is injected thereinto. Also, the battery structure is stacked in a bi-cell structure, impregnated with the electrolyte, and a secondary battery is then completed when the product thus obtained is put in a pouch and sealed.

Hereinafter, the present invention will be described in detail, according to specific examples. The invention may, however, be embodied in many different forms and should not be construed as being limited to the embodiments set forth herein.

Manufacture of $SiO_x$

Example 1

40 g of Si and 86 g of $SiO_2$ were put in a bottle and completely mixed by a pain shaker at a rate of 300 rpm for 3 hours or more. Next, an alumina boat containing 12.5 g of the mixture of Si and $SiO_2$ was placed in an alumina inner tube having one end blocked, which was placed in an alumina outer tube of a reactor. It was heated to 1400° C. while increasing the degree of vacuum of the reactor by operating a rotary pump and a turbo molecular pump. The temperature was increased from room temperature to 800° C. for 1 hour and 30 minutes and from 800° C. to 1400° C., i.e., a reaction temperature, for 2 hours and 30 minutes. The reaction was performed at the reaction temperature of 1400° C. for 3 hours. A mixed gas of $H_2/N_2$ ($H_2$: 2%) was supplied at a flow rate of 800 sccm and the pressure was decreased to $1.2 \times 10^{-1}$ torr. The pressure was maintained at $1.2 \times 10^{-1}$ torr until the reaction was completed while continuously supplying the mixed gas of $H_2/N_2$. The sublimator was naturally cooled after the reaction was completed. When the temperature of the sublimator was 300° C. or less, the gas supply was stopped to manufacture $SiO_x$ (where 0<x<1).

Example 2

$SiO_x$ was manufactured in the same manner as in Example 1 except that 0.83 g of active carbon was put in an alumina boat instead of supplying a mixed gas of $H_2/N_2$ ($H_2$: 2%) and the pressure was decreased to $8.8 \times 10^{-2}$ torr.

Comparative Example 1

$SiO_x$ was manufactured in the same manner as in Example 1 except that the degree of vacuum of a reactor was increased by operating a rotary pump instead of using a mixed gas of $H_2/N_2$ and the pressure was decreased to $2.6 \times 10^{-2}$ torr while increasing the temperature.

Comparative Example 2

$SiO_x$ was manufactured in the same manner as in Example 1 except that a mixed gas of $H_2/N_2$ was not used and the pressure was decreased to $1.1 \times 10^{-4}$ torr.

The following Table 1 presents molar ratios of silicon and silicon dioxide, reaction temperatures, holding times, and high degrees of vacuum of Examples 1 and 2 and Comparative Examples 1 and 2.

TABLE 1

| Examples | Si:$SiO_2$ (molar ratio) | Reaction temperature (° C.) | Holding time (hour) | High degree of vacuum (torr) | Value of x in $SiO_x$ |
|---|---|---|---|---|---|
| Example 1 | 1:1 | 1400 | 3 | $1.2 \times 10^{-1}$ | 0.90 |
| Example 2 | 1:1 | 1400 | 3 | $8.8 \times 10^{-2}$ | 0.88 |
| Comparative Example 1 | 1:1 | 1400 | 3 | $2.6 \times 10^{-2}$ | 1.16 |
| Comparative Example 2 | 1:1 | 1400 | 3 | $1.1 \times 10^{-4}$ | 1.13 |

Preparation of Coin-type Half Cell

Example 3

$SiO_x$ manufactured in Example 1 as an anode active material, acetylene black as a conductive agent, and polyvinylidene fluoride as a binder were mixed at a weight ratio of 95:1:4 and the mixture was mixed with a N-methyl-2-pyrrolidone solvent to prepare a slurry. One surface of a copper current collector was coated with the prepared slurry to a thickness of 30 μm, dried and rolled. Then, an anode was prepared by punching into a predetermined size.

10 wt % fluoroethylene carbonate based on a total weight of an electrolyte solution was added to a mixed solvent, which includes 1.0 M $LiPF_6$ and an organic solvent prepared by mixing ethylene carbonate and diethyl carbonate at a weight ratio of 30:70, to prepare an non-aqueous electrolyte solution.

A lithium foil was used as a counter electrode, a polyolefin separator was disposed between both electrodes, and a coin-type half cell was then prepared by injecting the electrolyte solution.

Example 4

A coin-type half cell was prepared in the same manner as in Example 3 except that $SiO_x$ manufactured in Example 2 was used as an anode active material.

Comparative Examples 3 and 4

Coin-type half cells were prepared in the same manner as in Example 3 except that $SiO_x$ manufactured in Comparative Examples 1 and 2 were respectively used as anode active materials.

Experimental Example 1

Initial Efficiency Measurement

In order to investigate initial efficiencies of the coin-type half cells prepared in Examples 3 and 4 and Comparative Examples 3 and 4, the coin-type half cells prepared in Examples 3 and 4 and Comparative Examples 3 and 4 were charged at 0.1 C to a voltage of 5 mV and charged to a current of 0.005 C at 5 mV under constant current/constant voltage (CC/CV) conditions at 23° C., and then discharged at 0.1 C to a voltage of 1.5 V under a constant current (CC) condition to measure the initial efficiencies. The results thereof are presented in Table 2 below.

TABLE 2

|  | Efficiency (1$^{st}$ Efficiency) |
|---|---|
| Example 3 | 72.49% |
| Example 4 | 72.49% |
| Comparative Example 3 | 59.72% |
| Comparative Example 4 | 61.68% |

As illustrated in Table 2, the initial efficiencies of the coin-type half cells prepared in Examples 3 and 4 were 72.49%. In contrast, the initial efficiencies of the coin-type half cells prepared in Comparative Examples 3 and 4 were 59.72% and 61.68%, respectively. Therefore, it may be understood that the initial efficiencies of the coin-type half cells prepared in Examples 3 and 4 were significantly better than those of the coin-type half cells prepared in Comparative Examples 3 and 4.

REFERENCE NUMERALS

1: REACTION CHAMBER
2: REACTOR
3: CONTAINER
4: ELECTRIC FURNACE
5: VACUUM PUMP
6: COLLECTOR
7: GAS NOZZLE

INDUSTRIAL APPLICABILITY

According to the present invention, since an amount of oxygen of silicon oxide may be controlled in a reducing atmosphere, an initial efficiency of a secondary battery may be increased, and since a reaction between $SiO_x$ and lithium atoms may be performed while maintaining a structure of $SiO_x$, lifetime characteristics may be improved. Thus, the present invention may be suitable for a secondary battery.

The invention claimed is:

1. A method of manufacturing silicon oxide, the method comprising:
   mixing silicon and silicon dioxide to obtain a mixture of silicon and silicon dioxide;
   placing the mixture of silicon and silicon dioxide in a reactor of a reaction chamber;
   depressurizing a pressure of the reaction chamber to obtain a high degree of vacuum while increasing a temperature in the reaction chamber to a final reaction temperature;
   providing a reducing atmosphere including a mixed gas of H2/N2 having a hydrogen content of 2 % to the reaction chamber; and
   reacting the mixture of silicon and silicon dioxide in the reaction chamber with the reducing atmosphere,
   wherein the final reaction temperature is in a range of 1300° C. to 1500° C. and is held for 2 hours to 4 hours,
   wherein the final reaction temperature is achieved by gradually increasing the temperature in the reaction chamber from room temperature to 800° C. for 1 hour and 30 minutes and from 800° C. to 1400° C. for 2 hours and 30 minutes,
   wherein the mixed gas of H2/N2 is supplied at a flow rate of 800 sccm,
   wherein the high degree of vacuum is at $1.2 \times 10^{-1}$ torr,
   wherein the high degree of vacuum is maintained until the reaction of silicon and silicon dioxide is completed, and the reducing atmosphere is continuously injected into one side of the reaction chamber and continuously removed from another side of the reaction chamber, and
   wherein the silicon oxide is $SiO_x$, $0<x\leq0.9$.

2. The method of claim 1, wherein the reducing atmosphere is supplied into the reaction chamber after the pressure in the reaction chamber reaches the high degree of vacuum.

3. The method of claim 1, wherein x=0.9.

* * * * *